United States Patent
Carlton et al.

(10) Patent No.: US 8,762,183 B1
(45) Date of Patent: Jun. 24, 2014

(54) SYSTEM FOR AUDITING PROPERTY INSURANCE CLAIMS THAT RESULT IN RESTORATION CLAIMS

(71) Applicant: Loss Control Systems, LLC, Roanoke, TX (US)

(72) Inventors: Wesley Clyde Carlton, Roanoke, TX (US); Paul Micheal Torretti, Roanoke, TX (US)

(73) Assignee: Loss Control Systems, LLC, Roanoke, TX (US)

( * ) Notice: Subject to any disclaimer, the term of this patent is extended or adjusted under 35 U.S.C. 154(b) by 0 days.

(21) Appl. No.: 14/220,999

(22) Filed: Mar. 20, 2014

(51) Int. Cl.
  *G06Q 40/00* (2012.01)
  *G06Q 40/08* (2012.01)
(52) U.S. Cl.
  CPC ..................................... *G06Q 40/08* (2013.01)
  USPC ............................................................ 705/4

(58) Field of Classification Search
  CPC ....................................................... G06Q 40/08
  USPC ............................................................ 705/4
  See application file for complete search history.

(56) References Cited

U.S. PATENT DOCUMENTS

| | | | | |
|---|---|---|---|---|
| 5,950,169 | A * | 9/1999 | Borghesi et al. | 705/4 |
| 2002/0035488 | A1* | 3/2002 | Aquila et al. | 705/4 |
| 2003/0028404 | A1* | 2/2003 | Herron et al. | 705/4 |
| 2003/0120588 | A1* | 6/2003 | Dodd et al. | 705/38 |
| 2004/0093242 | A1* | 5/2004 | Cadigan et al. | 705/4 |
| 2010/0305979 | A1* | 12/2010 | Hogan et al. | 705/4 |

* cited by examiner

*Primary Examiner* — Jagdish Patel
(74) *Attorney, Agent, or Firm* — Buskop Law Group, PC; Wendy Buskop

(57) ABSTRACT

A computer program product auditing property insurance claims that result in restoration claims using an administrative data storage connected to an administrative processor and a network, and a plurality of client devices connected to the network. The computer program product enables compliance with insurance agreements.

10 Claims, 9 Drawing Sheets

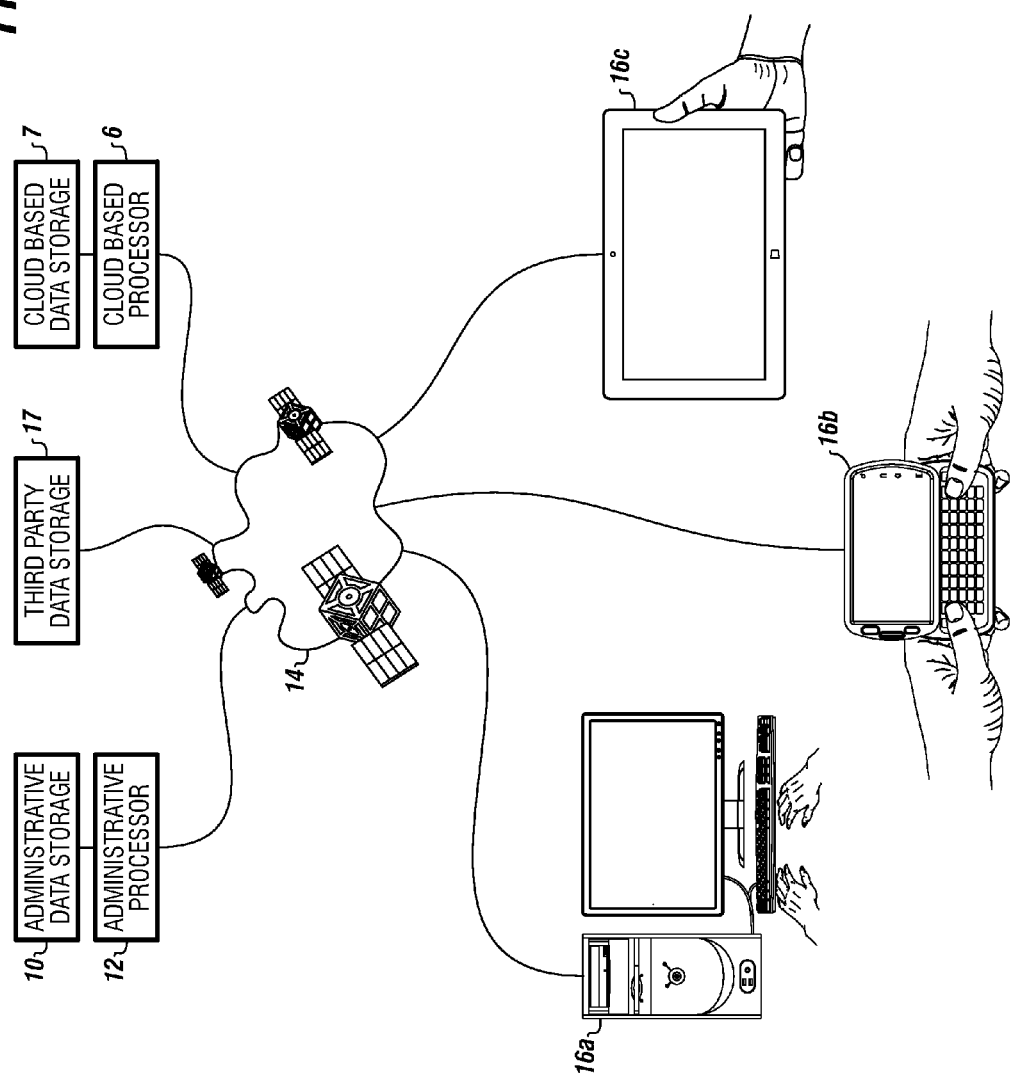

FIGURE 3

| | |
|---|---|
| DYNAMIC LIBRARY OF ROLLING 12-MONTH AVERAGE UNIT COSTS | 30 |
| UNIT COSTS | 32 |
| DATE OF COST | 34 |
| TYPE OF COST | 36 |
| GEOGRAPHIC LOCATION OF COST | 38 |
| TYPE OF DAMAGE | 40 |
| TYPE OF PROPERTY | 42 |
| INDUSTRY AVERAGE OF UNIT COSTS FOR RESTORATION CLAIMS | 60 |
| DATE OF COST | 62 |
| TYPE OF COST | 64 |
| GEOGRAPHIC LOCATION OF COST | 66 |
| TYPE OF DAMAGE | 68 |
| TYPE OF PROPERTY | 69 |

FIGURE 4

| | |
|---|---|
| DYNAMIC LIBRARY OF AGREEMENTS | 70 |
| PLURALITY OF RESTORATION COMPANY AGREEMENTS WITH AN INSURED | 72 |
| NAME OF A RESTORATION COMPANY | 74 |
| NAME OF AN INSURED | 76 |
| DATE OF AGREEMENT | 78 |
| UNIT COSTS USED BY THE RESTORATION COMPANY | 80 |
| PLURALITY OF RESTORATION COMPANY AGREEMENTS WITH INSURANCE COMPANIES | 82 |
| NAME OF A RESTORATION COMPANY | 74 |
| NAME OF AN INSURANCE COMPANY | 86 |
| DATE OF THE AGREEMENT | 88 |
| STORED TAGGED PORTIONS OF RESTORATION COMPANY AGREEMENTS WITH AN INSURED | 89 |
| UNIT COSTS USED BY THE INSURANCE COMPANY | 90 |
| TAGGED PORTIONS OF RESTORATION COMPANY AGREEMENTS WITH AN INSURANCE COMPANY | 91 |

FIGURE 6

| | |
|---|---|
| LIBRARY OF RESTORATION CLAIMS | 102 |
| RESTORATION CLAIM GENERATING EVENT TYPES | 104 |
| FIRE | 105 |
| WATER DAMAGE | 107 |
| EXPLOSION | 109 |
| FLOOD | 111 |
| EARTHQUAKE | 113 |
| VOLCANIC ERUPTION | 115 |
| TSUNAMI | 117 |
| TERRORIST EVENT | 119 |
| NAMED WEATHER EVENT | 121 |
| BUILDING TYPES | 106 |
| RESIDENTIAL BUILDING | 123 |
| WAREHOUSE | 125 |
| LIGHT COMMERCIAL BUILDING | 127 |
| OFFICE BUILDING | 129 |
| HIGH RISE BUILDING | 131 |
| GOVERNMENTAL FACILITY | 133 |
| HISTORICAL BUILDING | 135 |
| MANUFACTURING FACILITY | 137 |
| MEDICAL FACILITY | 139 |
| HOSPITALITY/HOTEL/RESORT FACILITY | 141 |
| RETAIL FACILITY | 143 |
| SCHOOL | 145 |
| DEGREES OF PROPERTY DAMAGE WITH SQUARE FOOT DAMAGE CALCULATIONS | 108 |
| TOTAL NUMBER OF SQUARE FEET | 110 |
| RATING FROM 1 TO 5 USING OBSERVATIONS OF A THIRD PARTY CLAIM ADJUSTER VIEWING THE DAMAGE | 112 |
| DAMAGE MULTIPLIER | 114 |
| SQUARE FOOT DAMAGE CALCULATION USING THE RATING, BUILDING TYPE, EVENT TYPE, TOTAL NUMBER OF SQUARE FEET AND THE DAMAGE MULTIPLIER | 116 |
| STORED UNIT COSTS | 1002 |

FIGURE 7

| | |
|---|---|
| LIBRARY OF RESTORATION COMPANY SUPPORTING DOCUMENTATION | 120 |
| NAME OF A RESTORATION COMPANY | 74 |
| PROPERTY INSURANCE CLAIM IDENTIFIER | 124 |
| RESTORATION COMPANY INVOICED COSTS | 126 |
| TRAVEL COSTS OF THE RESTORATION COMPANY PERSONNEL BY PROPERTY INSURANCE CLAIM IDENTIFIER | 128 |
| TIME TO COMPLETE A RESTORATION CLAIM BY PROPERTY INSURANCE CLAIM IDENTIFIER AS BILLED BY THE RESTORATION COMPANY | 130 |
| MATERIALS USED OR NEEDED TO COMPLETE A RESTORATION CLAIM BY PROPERTY INSURANCE CLAIM IDENTIFIER AS BILLED BY THE RESTORATION COMPANY | 132 |
| EQUIPMENT TO COMPLETE A RESTORATION CLAIM BY PROPERTY INSURANCE CLAIM IDENTIFIER AS BILLED BY THE RESTORATION COMPANY | 133 |
| OUT OF POCKET COSTS TO COMPLETE A RESTORATION CLAIM BY PROPERTY INSURANCE CLAIM IDENTIFIER AS BILLED BY THE RESTORATION COMPANY | 134 |

FIGURE 8

| | |
|---|---|
| AUDIT REPORT | 144 |
| KEY PERFORMANCE INDICATORS FOR THE RESTORATION COMPANY | 146 |
| PERFORMANCE SCORECARD FOR THE RESTORATION COMPANY USING A PERCENTAGE OF COMPLIANCE WITH THE EVENT TABLES, RATIO TABLES AND UNIT COST TABLES | 148 |

SYSTEM FOR AUDITING PROPERTY INSURANCE CLAIMS THAT RESULT IN RESTORATION CLAIMS

FIELD

The present embodiments generally relate to a computer program product for auditing property insurance claims that result in restoration claims.

BACKGROUND

A need exists for an easy to use auditing system that analyzes real time unit costs from contractors of restoration claims that compares the unit costs to the actual agreement costs and to libraries of industry standards, and produce an easy to view report on a client device for simultaneous viewing by a plurality of users.

A further need exists for a software product that enables the restoration to keep going without stopping due to errors in unit costs for projects associated with restoration claims for property damage.

The present embodiments meet these needs.

BRIEF DESCRIPTION OF THE DRAWINGS

The detailed description will be better understood in conjunction with the accompanying drawings as follows:

FIG. 1 depicts a diagram of equipment usable to operate the computer program product of the invention.

FIG. 3 depicts a diagram of a dynamic library of rolling 12-month average unit costs for restoration claims of property damage.

FIG. 4 depicts a diagram of a dynamic library of agreements which contain the agreements between an insured, an insurance company and a restoration company that control the unit costs for a restoration claim.

FIG. 6 depicts a diagram of a library of restoration claims which includes restoration claim generating event types, building types, and degrees of property damage with square foot calculations.

FIG. 7 depicts a library of restoration company supporting documentation created when a restoration company works on a restoration claim.

FIG. 8 shows a diagram of an audit report produced by the invention.

Figure 2A:
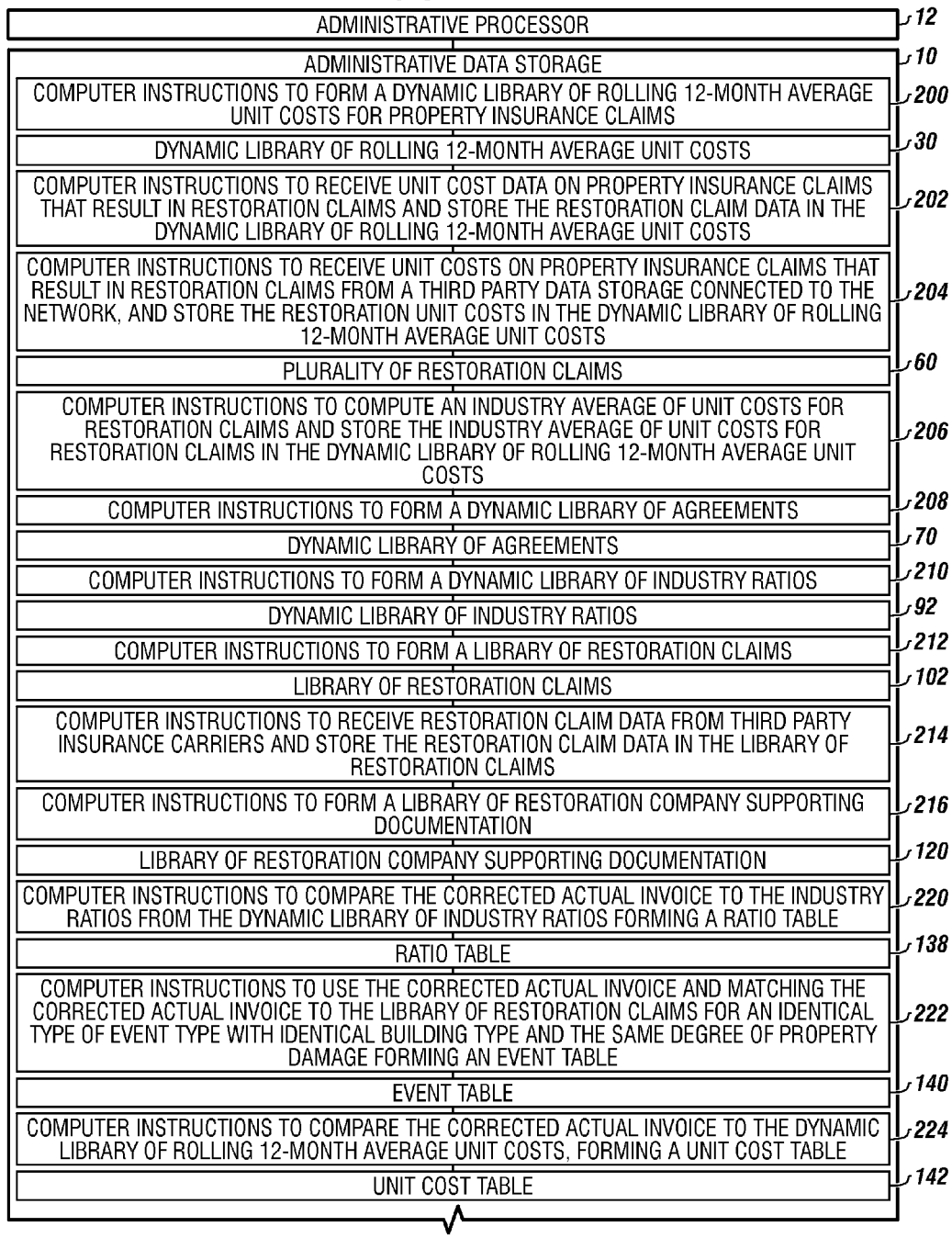
FIGS. 2A-2B depict an administrative processor connected to an administrative data storage and a diagram of computer instructions and tables in the administrative data storage.

The present embodiments are detailed below with reference to the listed Figures.

DETAILED DESCRIPTION OF THE EMBODIMENTS

Before explaining the present computer program product in detail, it is to be understood that the software program product is not limited to the particular embodiments and that it can be practiced or carried out in various ways.

Damage from terrorism, such as bombs, or plane damage to the World Trade Center cannot only be identified with the invention, but all claims and costs can be quickly, and easily audited for "real time" ratios and simultaneously in compliance with industry standards for a real time report on an "up to the minute" basis, which is at least daily.

Damage caused by fires, explosions, or cave-ins, can be identified with this invention.

The invention also enables the viewer of many simultaneous calculations produced with the invention to determine if the restoration company handling cleanup from the horrendous event is in compliance with agreements with an insured and agreements with an insurance company.

Not only does the invention enable quick identification of damages and auditing of costs, it also performs comparisons to industry known ratios using a library of 12-month rolling of unit costs to show if a contractor is abusing an insurance company or if a contractor is fleecing an insured.

People will be restored to their homes in record time, quickly and safely, with this invention by allowing numerous viewers of the status of the restoration, to see if Grandma Mary has been ignored for 2 weeks by her contractors who went and performed another job instead of finishing her job.

The invention also can be used to manage government costs in subsidizing major storm damage, such as from Superstorm Sandy in 2012.

The following definitions are used herein.

The term "insurance policy" is an insurance product that enables a holder of the policy to make a restoration claim.

The term "property insurance claims that results in restoration claims" refers to all forms of property claims, including emergency claims.

The term "schools" refers to buildings of a school district, building of an individual college or kindergarten or pre-K facility through graduate school buildings, including buildings of technical schools and other institutions which indicate to the internal revenue service that they are an institution of learning, non-profit or for profit.

The term "named weather event" refers to at least a hurricane, a snow storm, or a storm system for which the National Weather Service or NOAA, or another government agency has provided a number, a name, or another indicating symbol and an ability to track the storm.

The term "rolling 12-month average of unit costs per component of a restoration claim" refers to a list of unit cost by individual component which are then averaged over a 12-month period of time. Only unit costs calculated from a date of the restoration claim are used to form a 12-month average for those unit costs. In embodiments, the unit costs from a 13th month or more can be moved for storage into an accessible archive in the data storage. For example, a unit cost for safety glasses can be $2.25 in April of 2013, but can rise to $2.28 in May of 2013 and reach an all-time high of $2.50 in October of 2013. The unit costs are then mathematically averaged, that is the "rolling 12-month average of unit costs per component" includes a mathematical calculation of the average cost for the safety glasses over a 12-month window, which can work out to be $2.45 through March of 2014, for example.

The term "degree of property damage" in this application refers to an observed level of damage, which can be a rating from 1 to 5. The square footage which is damaged is then multiplied by a factor based on this observed level. The factor is a percentage from 0 percent to 100 percent. For example, a kitchen with smoke damage. The observed level of damage by a claim adjuster is 1 because 2 walls are not affected by the smoke. The number 1 defines the factor that the adjuster will actually use. The factor for 1 is minimal damage, the factor for 2 is moderate damage, the factor for 3 is significant damage including business interruption, the factor for 4 is extreme damage (including missing parts of the facility) and the factor 5 is catastrophic damage (including at least 3 to 6 months of restoration work required).

For example, anthrax terrorism for a US Post Office can be rated a 5. A cost×3 would be the degree of property damage.

In contrast to the US Post Office, a kitchen with smoke damage can be rated a 1.

To determine the degree of property damage, the size of the kitchen 800 square feet is multiplied by 1.

The following is an example of how the computer auditing computer program product can be used.

As a result of damages sustained occurring from exposure to high winds, tornado activity and heavy rains generated by Hurricane Chantilly, the Towers Resort in Palm Beach, Fla. experienced catastrophic damages to all 25 ocean facing floors impacting guest suite structure including floors, walls, ceilings, high end finishes, furnishings, and general contents.

Management for The Towers Resort engaged ABC Restoration and Mitigation Contractors, INC. (ABC) to provide emergency services encompassing removal of standing water, targeted demolition, and structural repairs to secure the building envelope, provide moisture stabilization and removal via dehumidification and structural drying, and cleaning and disinfecting services to address the hurricane borne bio-hazard and microbial infestation of the property.

The interested insurance market, comprised of lead US insurers and London market participants, engaged Loss Management Solutions, Inc. (LMS) to provide project oversight, management, clerk of the works, and invoice audit services to verify and establish the 'fair and reasonable' value of the work consistent with industry standards and practices for the scoping and costing elements of this phase of the claim.

Initially, LMS and ABC met to exchange the base rate schedules ABC desired to levy for the work contemplated. The ABC rate schedule was scanned and entered into the LCS cost control data management system in an effort to compare base rates against the regionally adjusted dynamic library of rolling 12-month average unit costs, adjusted for the region where the work was located. Comparative incremental costs were developed and discussed in an effort to agree on the base rate of cost for labor, equipment, and materials to be provided in the prosecution of the work. Upon completion of the analysis of base rate cost, a contract was executed between ABC and The Towers Resort considering the negotiated and agreed upon rate schedule.

Once work commenced, LMS project management and clerk of the works teams provided daily oversight to the activities and operations provided by ABC. Data was collected on a daily basis consisting of contractor crew sheets identifying at the crew level, supervisory, and labor as it was provided by ABC. Additionally, equipment usage was captured and tabulated based on visual observations conducted by LMS and verified by data generated by ABC. Finally, beginning inventories of materials anticipated to be consumed via the operation were collected, entered into the LCS cost control system and accounted for by declining balance based on usage data mined from the contractor crew sheets.

Raw data for labor and management elements entered into the LCS cost control system were analyzed considering comparative experienced usage elements considering supervisor to labor ratios and management to supervisor ratios for like kind previously experienced work, and compared against the most recent 12-month rolling averages located in their dynamic library of industry ratios to ensure that the proper supervisor to labor ratios were maintained consistent with normally anticipated labor loading in consideration of the work and industry standards previously experienced. Daily reports were generated by the LCS cost control system that tracked cost burn for labor and management compared to the overall established budget for the project and results were reflected in cost versus percentage of completion based on the dollar value burn rate.

As previously indicated, equipment and material usage was collected and entered into the LCS cost control system to generate a rolling cost for materials consumed and equipment used on conjunction with the agreed upon scope of work.

Following completion of the work, LMS received time and materials invoicing from ABC that reportedly reflected all costs incurred by ABC in the performance of the work. Invoicing was analyzed by LMS considering the mathematical calculations, the quality of the support documentation provided, and the comparison with data generated and captured in the field as received by the LMS PM and clerk teams. As a result of the audit process, LMS provided a full and detailed report to the interested insurers complete with calculations of cost as presented vs. cost as properly supported vs. cost as compared with industry averages and normally anticipated costs resulting in a report to the interested parties that clearly established the fair and reasonable value for the work provided, supported by accurate regionally adjusted, 12-month rolling cost data for comparison purposes. The net result yielded a net 22 percent reduction of the invoiced cost and was subsequently agreed to by all interested parties and used in the final settlement of the claim for this element.

Turning now to the Figures, FIG. 1 depicts a diagram of the system usable to operate the computer program product.

The computer program product can audit property insurance claims that result in restoration claims.

The computer program product can use an administrative data storage 10 connected to an administrative processor 12.

The administrative processor 12 can communicate with a network 14.

The network can be at least one of: the internet, another global communication network, a satellite network, a local area network, and/or a wide area network.

The network 14 can communicate simultaneously with a plurality of client devices 16a, 16b and 16c.

The network 14 can communicate with a third party data storage 17.

The network 14 can communicate with a cloud based data storage 7 via a cloud based processor 6 that communicates with the network 14.

In embodiments, the administrative processor with administrative data storage can be cloud based data storage and cloud based processing.

In embodiments, each of the client devices can be a handheld mobile communication device, a tablet, a personal digital assistant, a laptop, or another computer that can communicate with the network.

The third party data storage 17 can provide historical unit costs on property insurance claims that result in restoration claims.

Figure 2B:
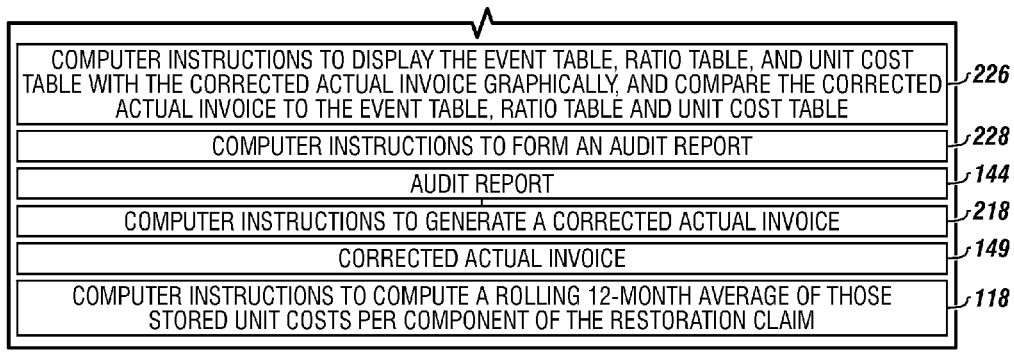

FIGS. 2A-2B depict a diagram of the administrative data storage 10 as connected to an administrative processor 12.

The administrative data storage 10 can include computer instructions 200 to form a dynamic library of rolling 12-month average unit costs for property insurance claims.

The administrative data storage 10 can include the formed dynamic library of rolling 12-month average unit costs 30.

The dynamic library of rolling 12-month average unit costs can classify unit costs by: date of cost, type of cost, geographic location of cost, and/or type of damage.

The administrative data storage 10 can include computer instructions 202 to receive unit cost data on property insurance claims that result in restoration claims and store the restoration claim data in the dynamic library of rolling 12-month average unit costs.

The administrative data storage 10 can receive the unit cost data via the network from the plurality of client devices connected to the network.

The administrative data storage 10 can include computer instructions 204 to receive unit costs on property insurance claims that result in restoration claims from a third party data storage connected to the network, and store the restoration unit costs in the dynamic library of rolling 12-month average unit costs.

The administrative data storage 10 can store a plurality of restoration claims 60 which relate to property damage, such as restoring a garage that was blown down in a force 1 hurricane that hit Houston, Tex. in 2011.

The administrative data storage 10 can include computer instructions 206 to compute an industry average of unit costs for the plurality of stored restoration claims and store the industry average of unit costs for restoration claims in the dynamic library of rolling 12-month average unit costs.

The administrative data storage 10 can include computer instructions 208 to form a dynamic library of agreements.

The administrative data storage 10 can include the formed dynamic library of agreements 70.

The administrative data storage 10 can include computer instructions 210 to form a dynamic library of industry ratios.

The administrative data storage 10 can include the formed dynamic library of industry ratios 92.

The administrative data storage 10 can include computer instructions 212 to form a library of restoration claims.

The administrative data storage 10 can include the formed library of restoration claims 102.

The administrative data storage 10 can include computer instructions 214 to receive restoration claim data from third party insurance carriers and store the restoration claim data in the library of restoration claims.

The administrative data storage 10 can include computer instructions 216 to form a library of restoration company supporting documentation.

The administrative data storage 10 can include the formed library of restoration company supporting documentation 120.

The administrative data storage 10 can include computer instructions 218 to generate a corrected actual invoice. A corrected actual invoice can be generated by: determining agreed unit costs using the dynamic library of agreements for a restoration claim; comparing the determined agreed unit costs to the library of restoration company supporting documentation; and generating a corrected actual invoice.

The administrative data storage 10 can include the corrected actual invoice 149.

The administrative data storage 10 can include computer instructions 220 to compare the corrected actual invoice to the industry ratios in the dynamic library of industry ratios forming a ratio table.

The administrative data storage 10 can include the formed ratio table 138.

The administrative data storage 10 can include computer instructions 222 to match the corrected actual invoice to the library of restoration claims for an identical type of event type with identical building type and the same degree of property damage, and form an event table.

The administrative data storage 10 can include the formed event table 140.

The administrative data storage 10 can include computer instructions 224 to compare the corrected actual invoice to the dynamic library of rolling 12-month average unit costs, forming a unit cost table.

The administrative data storage 10 can include the formed unit cost table 142.

The administrative data storage 10 can include computer instructions 226 to display the event table, ratio table, and unit cost table with the corrected actual invoice graphically, and compare the corrected actual invoice to the event table, ratio table and unit cost table.

The administrative data storage 10 can include computer instructions 228 to form an audit report.

The administrative data storage 10 can include the formed audit report 144.

The administrative data storage 10 can include computer instructions 118 to compute a rolling 12-month average of those stored unit costs per component of the restoration claim.

FIG. 3 depicts a diagram of the dynamic library of rolling 12-month average unit costs.

The dynamic library of rolling 12-month average unit costs 30 can include unit costs 32. The unit costs 32 can be classified by: date of cost 34, such as Jul. 4, 2012; type of cost 36, such as drywall repair to one kitchen window; geographic location of cost 38, such as Houston, Tex. south side; type of damage 40, such as water damage; and type of property 42, such as single family residence.

The dynamic library of rolling 12-month average unit costs 30 can include industry average of unit costs for restoration claims 60. The industry average of unit costs for restoration claims 60 can be classified by: date of cost 62, such as all costs between Sep. 1, 2012 hurricane event and Dec. 31, 2012; type of cost 64, such as all drywall repairs for single family residences; geographic location of cost 66, such as all houses in the Meyerland area of Houston, Tex.; type of damage 68, such as water damage due to a roof leak; and type of property 69, such as all single family houses.

FIG. 4 depicts a diagram of the dynamic library of agreements.

The dynamic library of agreements 70 can include a plurality of restoration company agreements with an insured 72. Each of the plurality of restoration company agreements with an insured can have a name of a restoration company 74, such as Dignity Restoration; a name of an insured 76, such as Jeffrey Boyd; a date of agreement 78 between the restoration company and the insured, such as Jan. 3, 2014; and unit costs used by the restoration company 80 to perform the restoration, such as $37 per hour to install fans, $45 per hour to remove tile, $61 per hour to install new drywall, and/or the like.

The dynamic library of agreements 70 can also include a plurality of restoration company agreements with insurance companies 82. Each of the plurality of restoration company agreements with insurance companies can include a name of the restoration company 74, such as Fred's Clean Up Central; a name of an insurance company 86, such as Buskop Insurance Company; a date of the agreement 88 between the restoration company and the insurance company, such as Aug. 13, 2013; tagged portions of restoration company agreements with an insured 89, such as the billing section; unit costs used by the insurance company 90, such as $45 per hour for removal of water; and tagged portions of restoration company agreements with an insurance company 91.

In embodiments, in the library of agreements, portions of the stored agreements are tagged for billing considerations forming stored tagged portions of restoration company agreements with an insured 89, and tagged portions of restoration company agreements with an insurance company 91.

In embodiments, the tagged portions in the library of agreements can be at least one of: per diems, specific procedures for billing, special considerations, and specific overtime guidelines.

In embodiments, the special considerations in the library of agreements can be specific to a geographic area wide event type.

Figure 5:
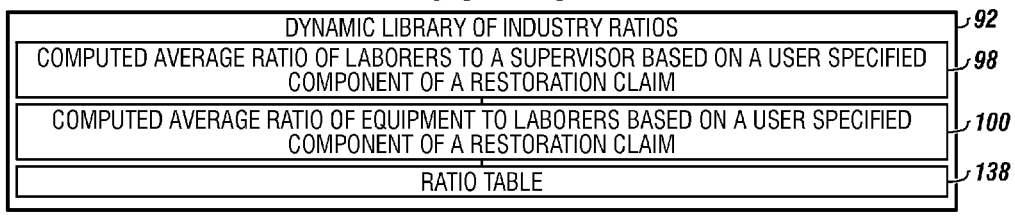
FIG. 5 depicts a diagram of a dynamic library of industry ratios which are known ratios of laborers to supervisors and laborers to another specified component, such as equipment used in a restoration claim.

FIG. 5 depicts a diagram of the dynamic library of industry ratios, which can be created with information on restoration claims.

The dynamic library of industry ratios 92 can include a computed average ratio of laborers to a supervisor based on a user specified component of a restoration claim 98. For example, the average ratio for a drywall installation for a room with four walls that meet at 90 degree angles and a door can be 1 supervisor to 4 workers in Texas, but 1 supervisor to 3 workers in Minnesota.

The dynamic library of industry ratios 92 can include a computed average ratio of equipment to laborers based on a user specified component of a restoration claim 100. For example, 2 saws to 4 laborers installing drywall in Houston, Tex. can be an industry ratio.

The dynamic library of industry ratios 92 can include a ratio table 138, which can show the ratios of laborers to supervisors and equipment to laborers using an average of all laborers to supervisors input for the restoration claims in a given area or for a given type of restoration.

FIG. 6 depicts a diagram of the library of restoration claims 102.

In embodiments, the library of restoration claims can include stored unit costs 1002 for each component of a restoration claim which is insured using an insurance policy; and can use computer instructions in the administrative data storage to compute a rolling 12-month average of those stored unit costs per component of the restoration claim.

The library of restoration claims 102 can include restoration claim generating event types 104. The restoration claim generating event types 104 can include fire 105, water damage 107, explosion 109, flood 111, earthquake 113, volcanic eruption 115, tsunami 117, terrorist event 119, and named weather event 121.

The library of restoration claims 102 can include building types 106. Building types can include: residential building 123, warehouse 125, light commercial building 127, office building 129, high rise building 131, governmental facility 133, historical building 135, manufacturing facility 137, medical facility 139, hospitality/hotel/resort facility 141; retail facility 143, and/or school 145.

The library of restoration claims 102 can include degrees of property damage with square foot damage calculations 108. The degrees of property damage with square foot damage calculations 108 can include a total number of square feet 110 to which damage has occurred, such as 54,000 square feet; a rating of the damage from 1 to 5 using observations of a third party claim adjuster viewing the damage 112; a damage multiplier 114; and a square foot damage calculation formed using the rating, building type, event type, total number of square feet, and the damage multiplier 116.

In embodiments, the library of restoration claims 102 can include stored unit costs 1002 for each component of a restoration claim which is insured using an insurance policy.

FIG. 7 depicts a diagram of the library of restoration company supporting documentation.

The library of restoration company supporting documentation 120 can include a name of a restoration company 74 and a property insurance claim identifier 124. Each property insurance claim identifier can have a restoration claim associated with it.

The library of restoration company supporting documentation 120 can include restoration company invoiced costs 126 linked to the property insurance claim identifier.

The library of restoration company supporting documentation 120 can include travel costs of the restoration company personnel by property insurance claim identifier 128.

The library of restoration company supporting documentation 120 can include time to complete a restoration claim by property insurance claim identifier as billed by the restoration company 130.

The library of restoration company supporting documentation 120 can include materials used or needed to complete a restoration claim by property insurance claim identifier as billed by the restoration company 132.

The library of restoration company supporting documentation 120 can include equipment to complete a restoration claim by property insurance claim identifier as billed by the restoration company 133 and out of pocket costs to complete a restoration claim by property insurance claim identifier as billed by the restoration company 134.

FIG. 8 depicts a diagram of an audit report. The audit report 144 can have key performance indicators for the restoration company 146 and a performance scorecard for the restoration company using a percentage of compliance with the event tables, ratio tables and unit cost tables 148.

Figure 9:
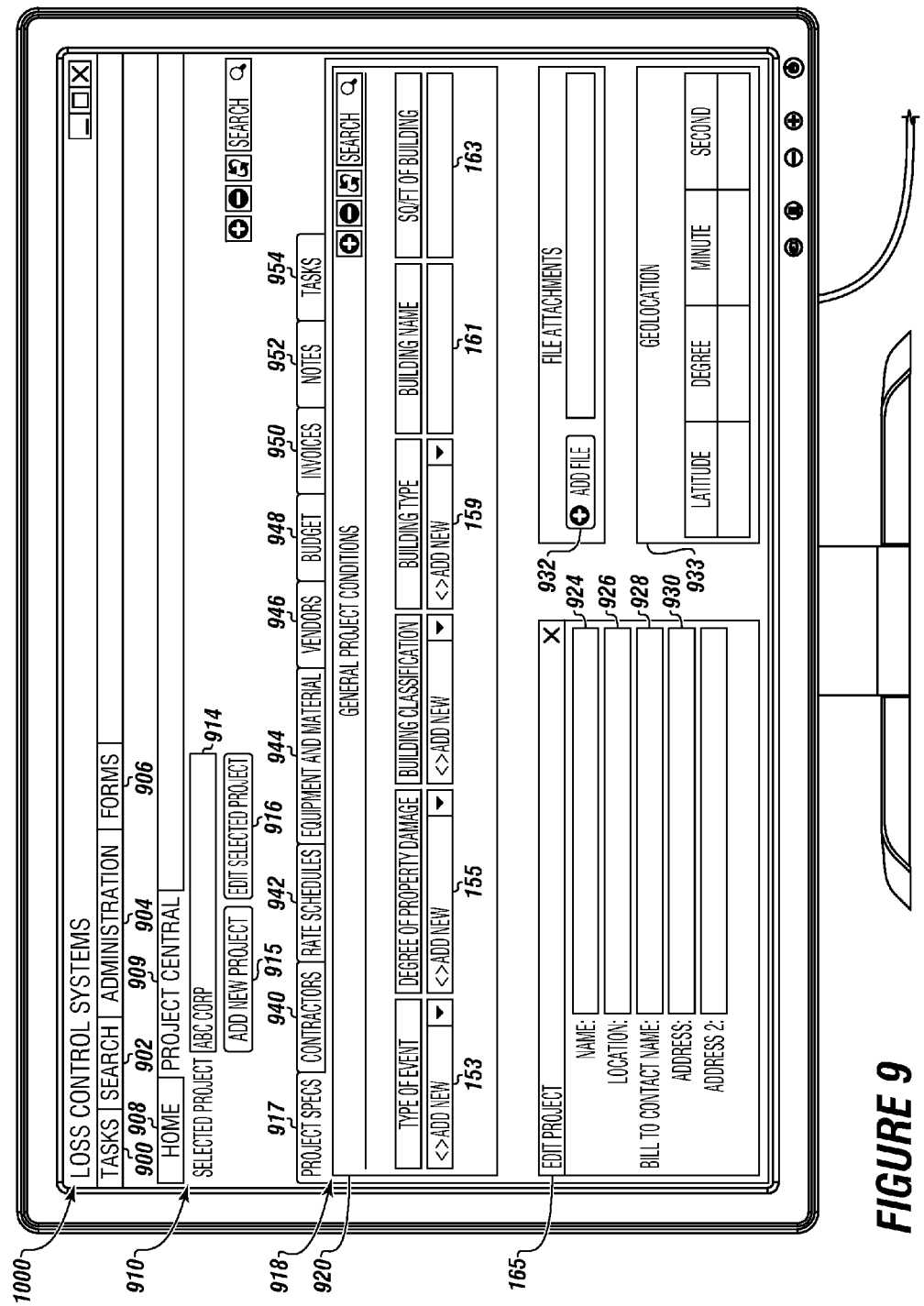
FIG. 9 displays an embodiment of a data entry screen usable in the invention.

FIG. 9 depicts a data capture screen usable with the client devices.

The data capture screen can include a tasks button 900 that allows a user to select from a home screen or a project central screen 910.

The data capture screen 1000 can include a search button 902 that allows a user to search for a contractor name, a project by name, and worker time sheet.

The data capture screen 1000 can include an administration button 904 that allows a user to view names of users, input a password and restrict the access a user has to the computer program product.

The data capture screen 1000 can include a forms button 906 that allows a user to print any data entry report using the client devices in case there is no network connectivity to the client devices.

The data capture screen 1000 can include a home button 908 that connects to a home screen that allows a user to view a set of hyperlinks that allow a user to quickly connect to information input areas, such as a link to connect to a time sheet, a link to connect to a search function, a link to the restoration claim contractor database.

The home screen can be viewable by the user if the user has a user account.

The data capture screen 1000 can include project central button 909 that presents a project central screen wherein a user can select a project using a selected project drop down box 914 that presents a project name, such as "ABC CORP".

The project central screen 910 can include an add new project button 915 that allows a user to add a new project to a selected project.

The project central screen 910 can include an edit selected project button 916 that allows a user to edit information for a selected project.

The project central screen 910 can include a project specs button 917 that displays a project specs screen 918.

The projects specs screen 918 can include a field that enables the user to set general project conditions 920.

Within the general project conditions 920 can be a drop down box 153 that enables the user to insert a type of event that caused the property damage meriting the restoration claims.

Within the general project conditions 920 can be a drop down box 155 that enables the user to insert a degree of property damage.

Within the general project conditions 920 can be a drop down box 159 that enables the user to insert a building type that had the property damage.

Within the general project conditions 920 can be a drop down box 161 that enables the user to insert a building name for the building that experienced the property damage.

Within the general project conditions 920 can be a drop down box 163 that enables the user to insert a square footage of the building that experienced the property damage.

The project central screen 910 can include an edit project field 165 with a name 924, a location of the building experiencing damage 926, a bill to contact name 928; and an address 930.

The project central screen 910 can enable the user to add a file 932.

The project central screen 910 can include a geolocation entry 933 by latitude, degree, minute and second which is critical in hurricane repair areas, as most hurricanes take out all the street signs.

Other input fields for the project central screen can include contractors 940, wherein a user can enter contractor information working on a restoration claim.

Other input fields for the project central screen can include rate schedules 942, wherein a user can enter or access a rate schedule for the restoration claim by insurance company or by restoration company.

Other input fields for the project central screen can include equipment and materials 944 wherein a user can enter or scan in information on equipment needed for the restoration claim or materials needed for the restoration claims or both.

Other input fields for the project central screen can include vendors 946 which are a list of outside vendors working on or eligible to work on the restoration claim.

Other input fields for the project central screen can include budget 948 which is a presentation of labor, equipment, materials, vendors and invoices for a particular project associated with a restoration claim.

Other input fields for the project central screen can include invoices 950 which are the invoices provided to a contractor for a restoration claim, such as a hotel bill, a gas bill, a lease of equipment bill which are reimbursable under the contract.

Other input fields for the project central screen can include notes 952 which include daily job notes that the user can enter concerning the restoration claim, such as 3 days of continuous rain flooded the job site preventing exterior painting.

Other input fields for the project central screen can include tasks 954 which list future job tasks, such as haul away garbage after restoration is complete.

In embodiments, the property insurance claims can be remediation claims.

Figure 10:
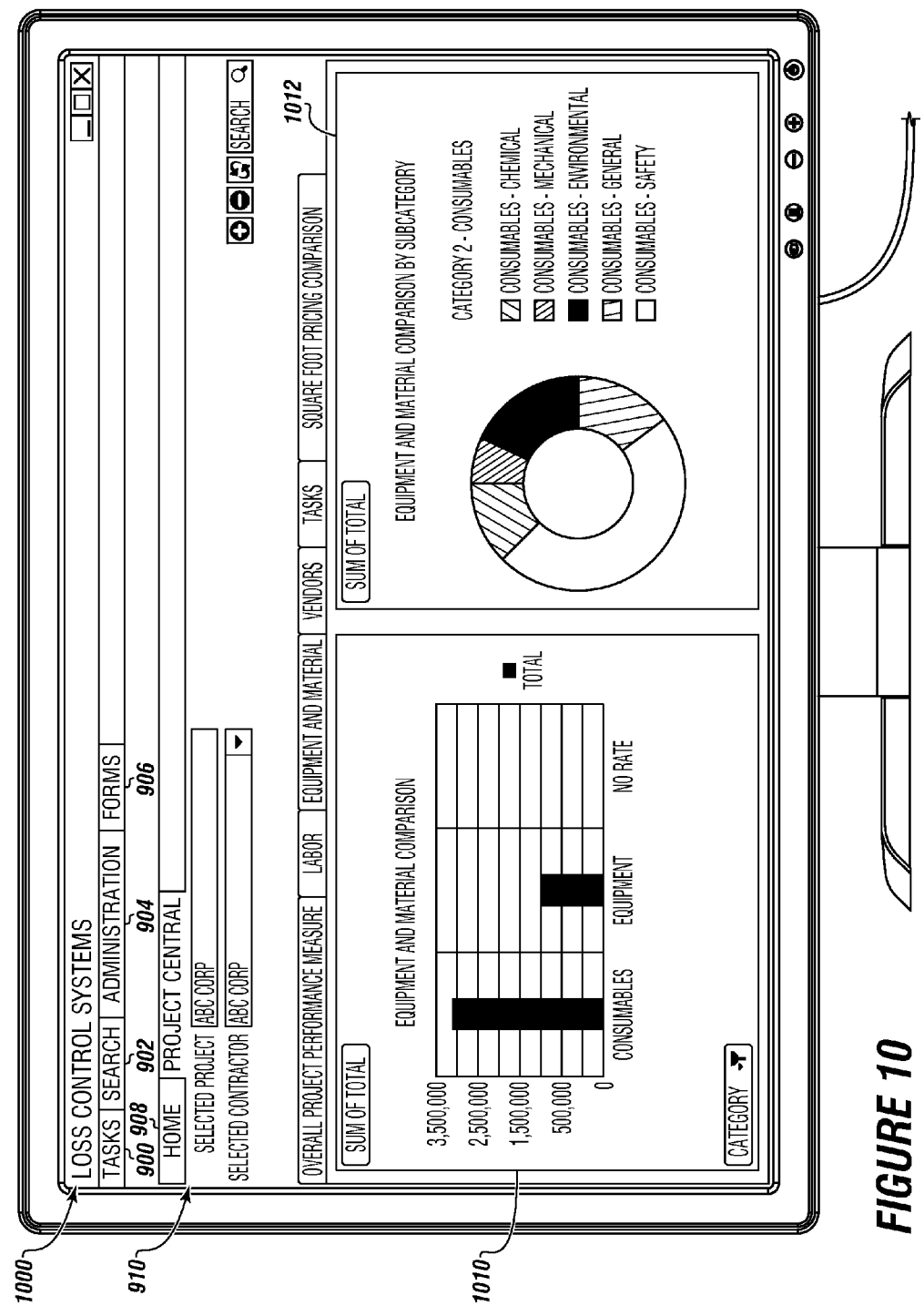
FIG. 10 displays the graphic elements produced by the software program product.

FIG. 10 depicts the data capture screen 1000 and project central screen 910 with the tasks button 900, search button 902, administration button 904, forms button 906 and home button 908.

The project central screen 910 can display a sum of total equipment and materials with a bar graph 1010 for a specific project.

The project central screen 910 can display a sum of total equipment and materials with a graphic element 1012 that shows percentages of consumables totaling 100 percent, namely the sum of total chemical consumables, the sum of total mechanical consumables, the sum of total environmental consumables, the sum of total general consumables and the sum of total safety consumables used on the specific project for ease of understanding.

Theses visual graphics enable a user to quickly review the audited components of a restoration claim.

While these embodiments have been described with emphasis on the embodiments, it should be understood that within the scope of the appended claims, the embodiments might be practiced other than as specifically described herein.

What is claimed is:

1. A system for auditing property insurance claims that result in restoration claims, wherein the system comprises:
  a. a network;
  b. an administrative processor in communication with the network;
  c. a plurality of client devices in communication with the network;
  d. an administrative data storage comprising a non-transitory computer readable medium, wherein the administrative data storage is in communication with the administrative processor, and the administrative data storage further comprises computer executable instructions to:
    (i) form a dynamic library of rolling 12-month average unit costs for property insurance claims, wherein the dynamic library of rolling 12-month average unit costs classifies unit costs by:
      1. a date of cost;
      2. a type of cost;
      3. a geographic location of cost;
      4. a type of damage; and
      5. a type of property;
    (ii) receive unit cost data on property insurance claims that result in restoration claims and store the restoration claim data in the dynamic library of rolling 12-month average unit costs from the plurality of client devices connected to the network;
    (iii) receive unit costs on property insurance claims that result in restoration claims from a third party data storage connected to the network, and store the restoration unit costs in the dynamic library of rolling 12-month average unit costs;
    (iv) compute an industry average of unit costs for restoration claims and store the industry average of unit costs for restoration claims in the dynamic library of rolling 12-month average unit costs, wherein the dynamic library of rolling 12-month average unit costs classifies the industry average of unit costs for restoration claims by:
      1. a date of cost;
      2. a type of cost;
      3. a geographic location of cost;
      4. a type of damage; and
      5. a type of property;
    (v) form a dynamic library of agreements comprising:
      1. a plurality of restoration company agreements with an insured comprising:
        a. a name of a restoration company;
        b. a name of an insured;

c. a date of agreement between the restoration company and the insured; and
d. unit costs used by the restoration company; and
2. a plurality of restoration company agreements with an insurance company comprising:
   a. the name of a restoration company;
   b. a name of an insurance company;
   c. a date of the agreement between the restoration company and the insurance company; and
   d. unit costs used by the insurance company;
(vi) form a dynamic library of industry ratios comprising at least one of:
   1. a computed average ratio of laborers to a supervisor based on a user specified component of a restoration claim; and
   2. a computed average ratio of equipment to laborers based on a user specified component of the restoration claim;
(vii) form a library of restoration claims comprising:
   1. restoration claims generating event types including at least one of: a fire, water damage, an explosion, a flood, an earthquake, a volcanic eruption, a tsunami, a terrorist event, and a named weather event;
   2. building types including at least one of: a residential building, a warehouse, a light commercial building, an office building, a high rise building, a governmental facility, a historical building, a manufacturing facility, a medical facility, a hospitality/hotel/resort facility; a retail facility, and a school; and
   3. degrees of property damage with square foot damage calculations, comprising:
      a. a total number of square feet;
      b. a rating from 1 to 5 using observations of a third party claim adjuster viewing the damage;
      c. a damage multiplier; and
      d. a square foot damage calculation using the rating from 1 to 5, the building type, the event type, the total number of square feet, and the damage multiplier;
(viii) receive restoration claim data from third party insurance carriers and store the restoration claim data in the library of restoration claims;
(ix) form a library of restoration company supporting documentation comprising:
   1. the name of a restoration company;
   2. a property insurance claim identifier, wherein the property insurance claim identifier has restoration claims;
   3. restoration company invoiced costs associated with the property insurance claim identifier comprising:
      a. travel costs by property insurance claim identifier as billed by the restoration company;
      b. time to complete a restoration claim by property insurance claim identifier as billed by the restoration company;
      c. materials to complete a restoration claim by property insurance claim identifier as billed by the restoration company;
      d. equipment to complete a restoration claim by property insurance claim identifier as billed by the restoration company; and
      e. out of pocket costs to complete a restoration claim by property insurance claim identifier as billed by the restoration company;
(x) generate a corrected actual invoice by:
   1. determining agreed unit costs using the dynamic library of agreements for a restoration claim; and
   2. comparing the determined agreed unit costs to the library of restoration company supporting documentation;
(xi) compare the corrected actual invoice to the industry ratios in the dynamic library of industry ratios forming a ratio table;
(xii) match the corrected actual invoice to the library of restoration claims for an identical type of event type with identical building type and the same degree of property damage, and form an event table;
(xiii) compare the corrected actual invoice to the dynamic library of rolling 12-month average unit costs, forming a unit cost table;
(xiv) display the event table, ratio table, and unit cost table with the corrected actual invoice graphically, and compare the corrected actual invoice to the event table, the ratio table and unit cost table; and
(xv) form an audit report comprising:
   1. key performance indicators for the restoration company; and
   2. a performance scorecard for the restoration company with the event table, the ratio table and unit cost table.

2. The system of claim 1, wherein the property insurance claims are restoration claims.

3. The system of claim 1, wherein the administrative processor is a cloud based processor and the administrative data storage is a cloud based data storage.

4. The system of claim 1, further comprising a cloud based data storage, wherein the cloud based data storage comprises a non-transitory computer readable medium, in communication with a cloud based processor in communication with the network.

5. The system of claim 1, wherein at least one client device of the plurality of client devices is a handheld mobile communication device, a tablet, a personal digital assistant, or a computer that can communicate with the network.

6. The system of claim 1, wherein the administrative data storage further comprises computer executable instructions to compute a rolling 12-month average of stored unit costs for each component of the restoration claim, and wherein the library of restoration claims comprises stored unit costs for each component of the restoration claim.

7. The system of claim 1, wherein the network is at least one of: the internet, a global communication network, a satellite network, a local area network, and a wide area network.

8. The system of claim 1, wherein in the library of agreements and portions of the restoration company agreements with an insured and restoration company agreements with an insurance company are tagged for billing considerations forming stored tagged portions of restoration company agreements with an insured, and forming stored tagged portions of restoration company agreements with an insurance company.

9. The system of claim 8, wherein the stored tagged portions in the library of agreements include at least one of: per diems, specific procedures for billing, special considerations, and specific overtime guidelines.

10. The system of claim 9, wherein the special considerations in the library of agreements are specific to a geographic area wide event type.

* * * * *